United States Patent
Cowan et al.

[11] Patent Number: 5,902,551
[45] Date of Patent: May 11, 1999

[54] PROCESS GAS DOCKING STATION WITH POINT-OF-USE FILTER FOR RECEIVING REMOVABLE PURIFIER CARTRIDGES

[75] Inventors: Cathy L. Cowan, San Jose; Lau Y. Hong, San Leandro, both of Calif.

[73] Assignee: Semi-Gas Systems, Inc., San Jose, Calif.

[21] Appl. No.: 08/822,159

[22] Filed: Mar. 21, 1997

Related U.S. Application Data

[63] Continuation of application No. 08/372,107, Jan. 13, 1995, abandoned.

[51] Int. Cl.$^6$ ............................ B01D 53/00; B01D 27/08; B01L 11/00
[52] U.S. Cl. .............................. 422/103; 96/147; 422/101
[58] Field of Search .................................... 422/101, 103; 96/147; 285/137.1, 150, 405; 73/30.04, 31.04, 756; 454/238

[56] References Cited

U.S. PATENT DOCUMENTS

| | | | |
|---|---|---|---|
| 3,926,806 | 12/1975 | Gaudet et al. | 210/137 |
| 3,929,356 | 12/1975 | De Vincent et al. | 285/137.1 X |
| 3,934,605 | 1/1976 | Legris | 285/150 X |
| 4,388,086 | 6/1983 | Bauer et al. | 55/75 |
| 4,454,765 | 6/1984 | Lodge | 73/756 X |
| 4,559,066 | 12/1985 | Hunter et al. | 55/274 |
| 4,688,422 | 8/1987 | Wood | 73/756 X |
| 4,722,830 | 2/1988 | Urie et al. | 422/103 X |
| 4,738,693 | 4/1988 | Tom | 95/90 |
| 4,848,989 | 7/1989 | Maeda | 55/319 |
| 4,877,521 | 10/1989 | Petrucci et al. | 210/171 |
| 4,920,766 | 5/1990 | Yamamoto et al. | 285/137.1 X |
| 4,971,110 | 11/1990 | Cato | 137/614.04 |
| 5,022,986 | 6/1991 | Lang | 210/94 |
| 5,139,747 | 8/1992 | Cato et al. | 422/122 |
| 5,197,330 | 3/1993 | Onodera | 73/756 X |
| 5,325,705 | 7/1994 | Tom | 73/31.03 |
| 5,401,298 | 3/1995 | Voss | 96/147 |
| 5,580,523 | 12/1996 | Bard | 422/50 |

FOREIGN PATENT DOCUMENTS

| | | |
|---|---|---|
| 64-78140 | 3/1989 | Japan . |
| 2096825 | 10/1982 | United Kingdom ................... 257/253 |

OTHER PUBLICATIONS

D. E. Pivonka *Appl. Spect.* 1991, 45, 597–603.
G.J. Moody et al. *Analyst.* 1988, 113, 103–108.
S. Alggret et al. *Anal. Chim. Acta* 1989, 222, 373–377.
R. G. Compton et al. *J. Chem. Soc., Faraday Trans.* 1990, 86, 1077–1081.
P. M. Bhadha et al. *Proc.—Inst. Environ. Sci.* 1994, 40$^{th}$, 161–168.

*Primary Examiner*—Arlen Soderquist
*Attorney, Agent, or Firm*—Law Offices of Thomas E. Schatzel A Prof. Corporation

[57] ABSTRACT

A docking station with a filter that sits inline in a process gas channel and that alternatively receives a loopback plate, a sensor plate and a removable purifier cartridge for particle removal as well as the removal of trace amounts of moisture, oxygen, and other chemical impurities from a gas stream. The removable purifier cartridge comprises a purifying medium with a pair of sealing poppet valves that automatically close when the cartridge is removed from the docking station. A block body is included in the docking station with gas line fittings for close gland-to-gland separations, while the purifier cartridge is off to one side, and not positioned directly in line between the glands.

4 Claims, 2 Drawing Sheets

PROCESS GAS DOCKING STATION WITH POINT-OF-USE FILTER FOR RECEIVING REMOVABLE PURIFIER CARTRIDGES

COPENDING APPLICATION

This application is a continuation of application(s) Ser. No. 08/372,107 filed on Jan. 13, 1995 now abandoned.

A U.S. patent application Ser. No. 08/275,036, filed Jul. 14, 1994, now abandoned, titled, BLOCK FILTER-PURIFIER is incorporated herein by reference as if fully set forth.

BACKGROUND OF THE INVENTION

1. Field of the Invention

The invention relates generally to gas filters and purifiers and more specifically to devices that remove both particles and chemical impurities from gases used to fabricate integrated circuits in the semiconductor industry.

2. Description of the Prior Art

Semiconductor processing requires the use of a wide variety of gases in the fabrication process. The conductivity of semiconductor materials is controlled by the careful introduction of certain impurities, such as phosphorus and boron. Unwanted impurities, or even the right ones in the wrong amounts, can spoil all the semiconductor wafers subject to the contamination. Semiconductor manufacturers go to great lengths to buy pure silicon ingots, design and operate class 100, class 10, and class 1 cleanrooms, and even require personnel to wear lint-free "bunny suits" to reduce the risk of contamination.

Gas producers take great care to supply contamination-free gases, but contaminants inevitably creep in. The semiconductor industry therefore customarily uses filters and purifiers at the point-of-use near where the gas is actually used in the process. As such, space is at a premium. Available space is also shrinking with successive generations of equipment as the tools that use them are getting smaller and smaller. Periodic replacement of both filters and purifiers is needed, and this requires that connectors and valves be included and the filters and purifiers located so as to accommodate service. Both the valves and the location needs consume more valuable space.

Several manufacturers worldwide produce a range of purifiers that use various purifying agents internal to the devices. SAES Pure Gas (San Luis Obispo, Calif.) produces a purifier that uses a gettering alloy that must be heated during regeneration. Japan Pionics, Nippon Sanso, Advanced Technology Materials, Inc. (New Milford, Conn.), and Ergenics (Wyckoff, N.J.) also make commercially available purifiers. Matheson Electronics Product Group, Semi-Gas Division (San Jose, Calif.), produces a line of purifiers that are filled with a highly reactive resin that is commercially marketed as NANOCHEM®. The NANOCHEM resin does not require heating during use and is much less expensive to operate than the types that do require heating. The NANOCHEM, however, must be protected from exposure to air. Also, none of the resin material should be allowed to come close to welds as they are being made, because welding a purifier closed can cause the NANOCHEM resin material to melt. Such melting can release enough contaminants to saturate the remaining resin in the purifier.

As integrated circuit semiconductor device geometries decrease, the purification of gases used in fabrication needs to be closer to the point of use. The number of conventional filter-purifiers is limited in such applications. Some otherwise acceptable filter-purifiers are only available in a gland-to-gland dimension of 3.31 inches and have unacceptably low flow rates. Many prior art devices are, at times, difficult to install, because they have an outer radius of 0.75 inches, which is more than the port-center-to-back dimension of the majority of mass flow controllers (MFCs) that they are used with. Standoff brackets are often required to raise the MFCs and other manifold components to accommodate such filter-purifiers.

Equipment gas manifolds are increasingly using smaller footprints. A modular block approach to purification is needed for such applications and to allow for the industry trend toward smaller gland-to-gland and vertical height dimensions.

Modern-day users require purification systems that are located close to the point of use, e.g., inside the housing of a mass flow controller. However, such locations are crowded and provide inadequate room in-line with the process gas flows to accommodate the necessary filter and purification units. The life times and range of process gas applications of conventional units in such tight spaces are very limited. Frequent filter-purifier changes can compromise the very gas distribution system being protected, because each change allows some contaminating outside gases, e.g., water vapor and air, to enter.

At the time a process gas panel is ordered, manufactured and/or installed, it may not be clear what, if any gas purification system needs to be included. In prior art equipment, the adding-on of a gas purification system in a gas panel is difficult because of the tight spaces and can compromise the gas distribution channel by introducing contaminants during the installation of the purifier.

SUMMARY OF THE PRESENT INVENTION

It is therefore an object of the present invention to provide a purification system that can be located close to the point of use.

It is another object of the present invention to provide a purification system that is not limited by the in-line gas flow dimensions afforded in mass flow controller applications.

It is a further object of the present invention to provide a purification system that has a removable cartridge.

It is still a further object of the present invention to provide a docking station with a simple filter that can later be upgraded to a purification system by attaching a removable cartridge.

Briefly, a preferred embodiment of the present invention includes a docking station with a filter that sits inline in a process gas channel and that alternatively receives an adapter plate, a sensor plate and a removable purifier cartridge for particle removal as well as the removal of trace amounts of moisture, oxygen, and other chemical impurities from a gas stream. The removable purifier cartridge comprises a purifying medium with a pair of sealing poppet valves that automatically close when the cartridge is removed from the docking station. A block body is included in the docking station that provides gas line fittings with gland-to-gland separations that are not limited how close they can be by the diameter of the purifier cartridge, because the purifier cartridge is positioned off to one side, and not directly in-line between the glands.

An advantage of the present invention is that a system is provided for stubbing off a purifier dock during the manufacture of a gas panel such that the later inclusion of a purifier is simplified.

A further advantage of the present invention is that a flexible docking station is provided in a gas distribution system for the attachment of a variety of in-flow devices.

Another advantage of the present invention is that a docking station is provided that exposes a gas panel to only a minimal amount of contamination from the ambient air during installation of dockable devices.

These and many other objects and advantages of the present invention will no doubt become obvious to those of ordinary skill in the art after having read the following detailed description of the preferred embodiments which are illustrated in the various drawing figures.

IN THE DRAWINGS

FIG. 1 is an exploded assembly view of a process gas docking station embodiment of the present invention shown with three alternative attachments, an adapter plate, a sensor plate and a purifier; and FIG. 2 is a cross-sectional view of the block and purifier combination of FIG. 1.

DETAILED DESCRIPTION OF THE PREFERRED EMBODIMENTS

Figure 1:
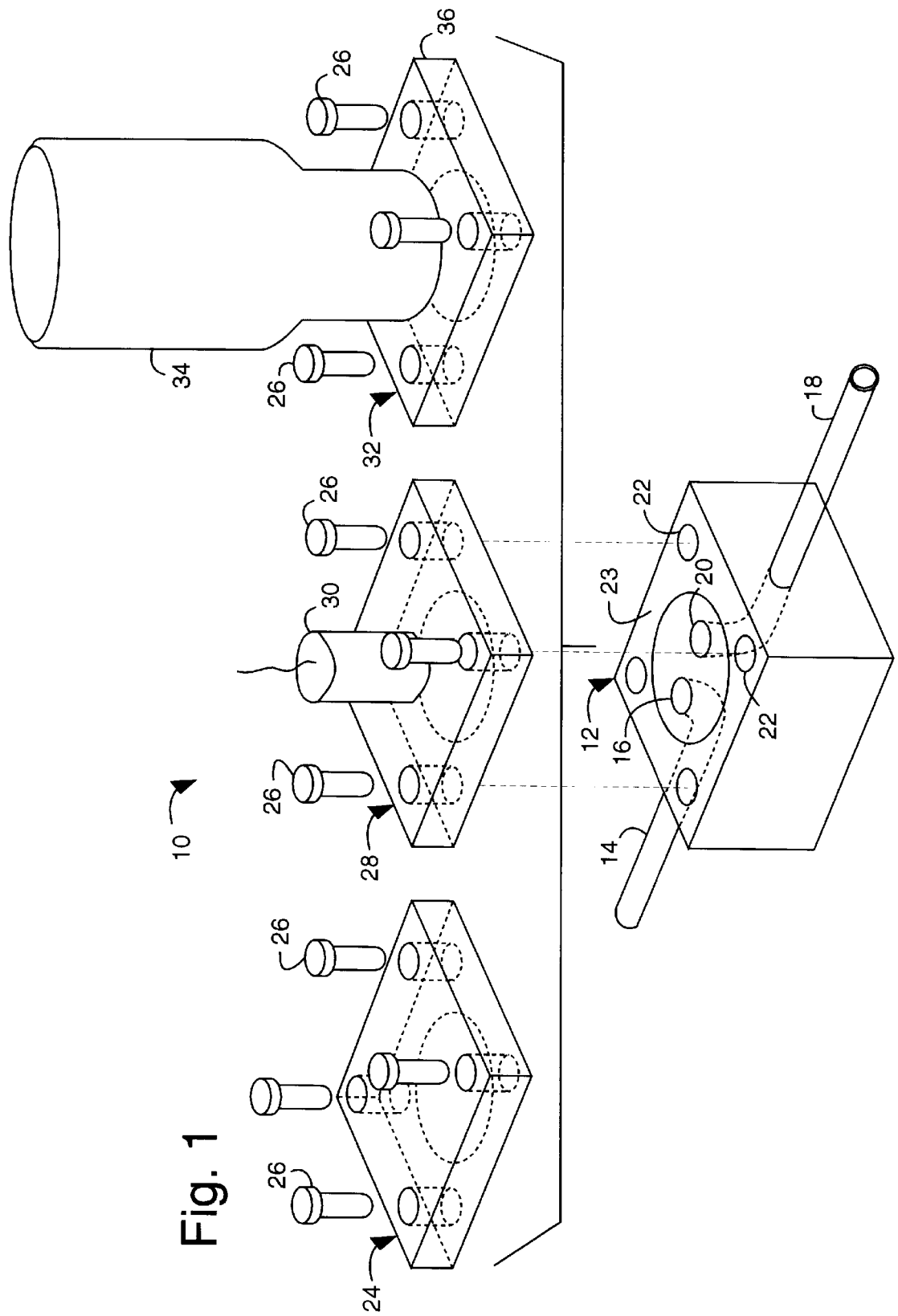

FIG. 1 illustrates a process gas docking station embodiment of the present invention, referred to by the general reference numeral 10. A block 12 has a gas inlet tube 14 channeled to an inlet port 16. An outlet tube 18 is connected to an outlet port 20. A set of four bolt holes 22 are arranged in particular pattern and the position of ports 16 and 20 are fixed on a flat docking face 23, in order that a range of interchangeable units may be received. For example, a loopback plate 24 is attached to the block 12 with a set of four bolts 26 that screw into the holes 22. The loopback plate 24 is configured to simply return any gas flow from inlet port 16 to the outlet port 20. Therefore, the block 12 is not a T-fitting, any gas channel flow must pass through the interchangeable units and can therefore be controlled and/or processed by them.

Alternatively to the adaptor plate 24, another interchangeable unit is a sensor plate 28 with a pressure transducer 30 is attached by the bolts 26 to the block 12. The sensor plate 28 is configured to return any gas flow from inlet port 16 to the outlet port 20 while allowing the pressure transducer 30 to sense the gas pressure. The sensor plate 28 may alternatively be fitted with other gas measuring and control devices, e.g., chemical analyzers and automatic valves.

A gas purifier in a removable cartridge 32 may also be interchangeably attached to the block 12, instead of the loopback plate 24 or the sensor plate 28. A gas flow from the inlet port 16 is purified through a purifier canister 34 before being returned to the outlet port 20. Since the loopback plate 24 is interchangeable with the removable cartridge 32, the block 12 may be permanently installed by connecting the tubes 14 and 18 in a gas panel, mass flow controller, or other gas distribution system, during manufacture. Later, a user needing to purify particular process gases near the point of use, can exchange the loopback plate 24 for the purifier 32 on the block 12. Otherwise, the loopback plate 24 may be left in place on the block 12 until something else is needed, such as sensor plate 28.

Figure 2:
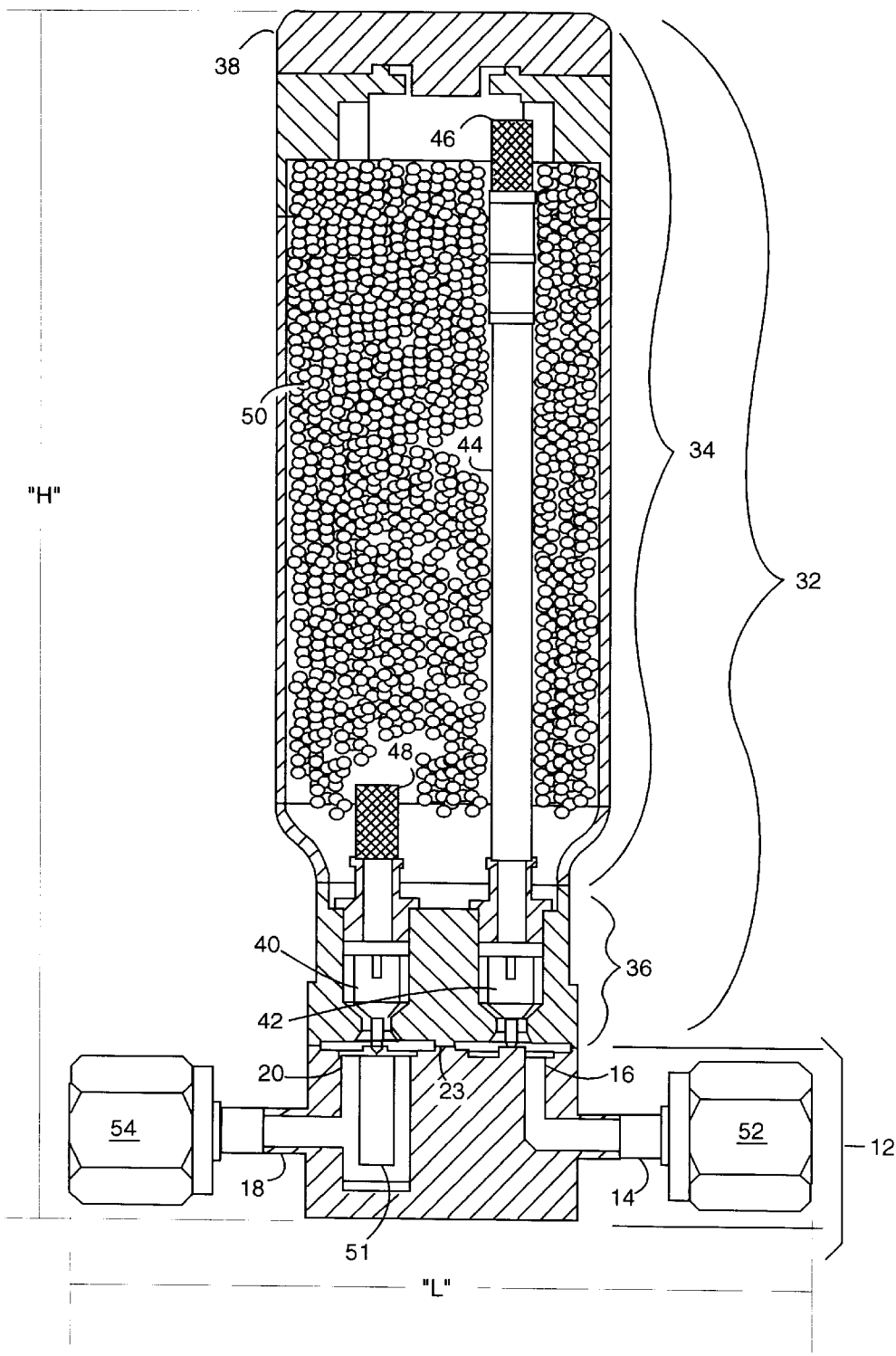

FIG. 2 shows the combination of the block 12 and the purifier 32 in more detail. Preferably, the operating pressure range is from vacuum to 125 pounds per square inch, gauge (PSIG). The canister 34 has a welded base 36 for attachment to the block 12, an end cap 38, an exit valve 40 and an entrance valve 42. A tube 44 conducts entering gas through a screen mesh (frit) 46. Another screen mesh (frit) 48 allows gas to exit after passing through a purification medium 50, e.g., a resin, preferably NANOCHEM®, which forms a resin bed contained between the two screens 46 and 48. (Purifying mediums, such as NANOCHEM®, have the consistency of Styrofoam balls the size of grains of sand.) A high-efficiency metal filter 51 is included within the block 12. For applications that require them, gland-type fittings, such as a pair of fittings 52 and 54, may be attached to the tubes 14 and 18, respectively. The pipe fittings 52 and 54 are preferably standard quarter-inch machined-on male or welded-on female fittings, e.g., Cajon Company "VCR®" type compatible fittings. Alternatively, tube ends may be welded on for special fittings or all-welded for gas manifolds.

Typical process gases that may be purified by the combination of the block 12 and the purifier 32, as shown in FIG. 2, include: ammonia, argon, arsine, chlorine, cyclopropane, dichlorosilane, ethane, germane, halocarbon-14, halocarbon-116, halocarbon-C318, helium, hydrogen, hydrogen-bromide, hydrogen-chloride, hydrogen-fluoride, krypton, methane, neon, nitrogen, nitrous-oxide, oxygen, perfluoro-propane, propane, silane, silicon-tetrachloride, sulfur-hexafluoride, trichlorosilane and xenon. Therefore, an all stainless steel construction of the block 12 and purifier 32 is preferred, e.g., with SS-316.

Such process gases are comonly used in the manufacture of semiconductor devices. Therefore, the combination of the block 12 and the purifier 32, as shown in FIG. 2, is preferably used in connection with the conventional fabrication and manufacture of semiconductor integrated circuits.

The valves 40 and 42 are preferably poppet-type valves that automatically close and seal medium 50 from contamination from the outside air whenever the removable cartridge 32 is separated from the in-line block 12. Such poppet-valves are described in U.S. Pat. Nos. 4,971,110, and 5,139,747, which are incorporated herein by reference.

In operation, gas flows through the combination of the block 12 and the purifier 32 by entering through the pipe fitting 52, through the valve 42 which is open, up the tube 44 through the screen 46. The medium 50 purifies the gas which exits into the screen 48, pass the valve 40 which is open, pass filter 51, and out the pipe fitting 54. Preferably, the combination of the block 12 and the purifier 32 has a gland-to-gland dimension "L" (FIG. 2) of 3.31 inches or five inches and a height dimension "H" not exceeding seven inches. Future applications are expected to require gland-to-gland dimensions "L" (FIG. 2) that are less than 3.31 inches. Although very short dimensions "L" may be useful, the purification capacity may be reduced accordingly. The width of the combination of the block 12 and the purifier 32, which is perpendicular to the plane of FIG. 2, is preferably less than two inches. Such dimensions allow the combination of the block 12 and the purifier 32 to be used in-line with a commercially-available mass flow controller (MFC), or other such components, including valves, regulators, etc.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A process-gas docking station (10), comprising:

a block body (12) having a plurality of sides, a plurality of bolt holes (22), and a flat docking face (23);

a gas inlet (14) separate and independent from a gas outlet (18) that enter the block body through one of said plurality of sides and are respectively connected to a gas inlet port (16) that terminates at said flat docking face (23) and a gas outlet port (20) that also independently terminates at said flat docking face (23);

wherein said gas inlet (14) includes a first conduit through the block body (12) to said gas inlet port (16);

wherein said gas outlet (18) includes a second conduit separate from said first conduit and that passes through the block body (12) to said gas outlet port (20); and a metal filter (51) for filtering a gas flow is positioned within said second conduit between said gas outlet tube (18) said gas outlet port (20);

wherein said flat docking face provides for a sealed connection of a flat-faced docking body to said gas inlet port (16) and gas outlet port (20) which is attached using said plurality of bolts holes (22).

2. A process gas docking station (10), comprising:

a block body (12) having a plurality of sides, a plurality of bolt holes (22), and a flat docking face (23);

a gas inlet (14) separate and independent from a gas outlet (18) that enter the block body through one of said plurality of sides and are respectively connected to a gas inlet port (16) that terminates at said flat docking face (23) and a gas outlet port (20) that also independently terminates at said flat docking (23);

wherein said gas inlet (14) includes a first conduit through the block body (12) to said gas inlet port (16);

wherein said gas outlet (18) includes a second conduit separate from said first conduit and that passes through the block body (12) to said gas outlet port (20); and a dockable gas device (24, 28, 32) is attached to the block body (12) by a set of bolts (26) in said bolt holes (22) to make a gas-tight seal at said flat docking face (23) and for directing a gas flow from said gas inlet port (16) to said gas outlet port (20);

wherein, the dockable gas device comprises a sensor plate (28) with a transducer (30) for measuring the pressure of said gas flow from said gas inlet port (16) to said gas outlet port (20).

3. A process gas docking station (10), comprising:

a block body (12) having a plurality of sides, a plurality of bolt holes (22), and a flat docking face (23);

a gas inlet (14) separate and independent from a gas outlet (18) that enter the block body through one of said plurality of sides and are respectively connected to a gas inlet port (16) that terminates at said flat docking face (23) and a gas outlet port (20) that also independently terminates at said flat docking face (23);

wherein said gas inlet (14) includes a first conduit through the block body (12) to said gas inlet port (16);

wherein said gas outlet (18) includes a second conduit separate from said first conduit and that passes through the block body (12) to said gas outlet port (20); and a dockable gas device (24, 28, 32) is attached to the block body (12) by a set of bolts (26) in said bolt holes (22) to make a gas-tight seal at said flat docking face (23) and for directing a gas flow from said gas inlet port (16) to said gas outlet port (20); and wherein, the dockable gas device comprises a gas valve for controlling said gas flow from said gas inlet port to said gas outlet port.

4. A semiconductor process gas docking station (10), comprising:

a block body (12) having a plurality of sides, a plurality of bolt holes (22), and a flat docking face (23);

a gas inlet (14) separate and independent from a gas outlet (18) that enter the block body through one of said plurality of sides and are respectively connected to a gas inlet port (16) that terminates at said flat docking face (23) and a gas outlet port (20) that also independently terminates at said flat docking face (23);

wherein said gas inlet (14) includes a first conduit through the block body (12) to said gas inlet port (16);

wherein said gas outlet (18) include sa second conduit separate from said first conduit and that passes through the block body (12) to said gas outlet port (20); and a dockable gas device (24, 28, 32) is attached to the block body (12) by a set of bolts (26) in said bolt holes (22) to make a gas-tight seal at said flat docking face (23) and for directing a semiconductor process gas flow from said gas inlet port (16) to said gas outlet port (20);

wherein, the dockable gas device (32) comprises gas purification resin bed (50) in a removable cartridge (34) connected to a welded base (36) with automatic closing valves (40, 42) located together at one end and provide for connection to said flat docking face (23), and providing for the scrubbing of impurities from said semiconductor process gas flow.

* * * * *